US005576153A

United States Patent [19]

Inaba

[11] Patent Number: 5,576,153

[45] Date of Patent: Nov. 19, 1996

[54] PHOTOGRAPHIC FILM

[76] Inventor: Minoru Inaba, No. 1116, Oaza Samukawa, Oyama-shi, Tochigi-ken, Japan

[21] Appl. No.: 515,947

[22] Filed: Aug. 16, 1995

[30] Foreign Application Priority Data

Apr. 6, 1995 [JP] Japan .................................... 7-081478
Apr. 25, 1995 [JP] Japan .................................... 7-101465

[51] Int. Cl.[6] ............................ G03C 11/14; G03C 9/00; G03B 21/64

[52] U.S. Cl. .......................... 430/501; 430/496; 430/347; 430/644; 352/241; 396/324; 396/613

[58] Field of Search .................................... 430/496, 501, 430/347, 644; 354/111, 114, 116; 352/241

[56] References Cited

U.S. PATENT DOCUMENTS 2,527,765 10/1950 Roehrl ........................................ 40/159
4,295,713 10/1981 Edwards .................................. 352/235
5,338,650 8/1994 Iwagaki .................................. 430/496
5,447,828 9/1995 Inaba ...................................... 430/496

FOREIGN PATENT DOCUMENTS 423398 4/1911 France .
1134573 4/1957 France .

*Primary Examiner*—Mark F. Huff
*Attorney, Agent, or Firm*—Fattibene and Fattibene; Paul A. Fattibene; Arthur T. Fattibene

[57] ABSTRACT

This invention is a photographic film proposed to facilitate a cutting operation of the photographic film by accurately cutting a longitudinal central position of perforations and to facilitate an editing operation of cut stereo photographs, and has a constitution which has perforations provided along the vicinities of both upper and lower side edges of the photographic film, cutting marks described as latent images by preexposure at a longitudinal center of a periphery of each perforation. Further, frame numbers for a stereo photograph are described as latent images by preexposure at a lower edge of each photographic picture plane of the film.

6 Claims, 3 Drawing Sheets

PHOTOGRAPHIC FILM

BACKGROUND OF THE INVENTION

This invention relates to a photographic film and, more particularly, to a perforated roll film.

DESCRIPTION OF THE PRIOR ART

A perforated photographic film such as a conventional 35 mm photographic film or the like has perforations at a constant interval near both side edges of the film. A pitch of the perforations is, for example, about 4.735 mm in the 35 mm film. A sprocket wheel of a motion picture projector is originally so engaged with the perforations of a motion picture film as to feed the motion picture film.

In a still camera, a sprocket wheel is engaged with the perforations of a film, a feeding amount of the film is detected, and a feeding amount of each frame is controlled constantly. In a reversal film, since an edge of a picture plane photographed, for example, in a black background and a gap between the picture planes are similarly developed in a black color, it is not easy to judge a boundary between the edge of the picture plane and the gap between the picture planes when the developed reversal film is cut between frames. Since the gap is disposed substantially intermediate of the perforations and aligned at a small pitch in a feeding direction of a perforated roll film, no target of a cutting position exists. Therefore, there is a fear that a cutting position may be erroneously cut to damage the picture plane, and hence it has a disadvantage that attention must be paid to its handling.

In order to, therefore, improve handleability by facilitating judgement of a cutting position when a developed film is cut at each one frame, the inventor of this application has already proposed a photographic film in which perforations of a roll film are disposed at a gap between photographed picture planes (Japanese Patent Application No. 6-108,803 corresponding to U.S. Pat. No. 5,447,828). In this photographic film, a pitch of the perforations is set equally to that of photographed picture planes of a camera, and the film is used for a camera so designed that a film feeding mechanism in which the perforations are disposed at the gap between the photographed picture planes, and hence the perforations becomes a target of a cutting position of the photographic film.

The inventor of this application has also proposed a photographic film in which a pitch of perforations is so set as to become ½ or ⅓ or the like of a pitch of right and left exposure surfaces of a stereo camera (Japanese Patent Application No. 6-292682). This photographic film is used for a stereo camera having a film feeding mechanism corresponding to the perforations. The frame of the film is cut with the perforations opposed at upper and lower edges of the film acting as a target thereby to form a stereo photograph of an accurate picture plane size.

The perforations of the photographic film are disposed at the gap between the photographed picture planes thereby substantially eliminating a fear of erroneously cutting the photographic film. However, in the case where the gap between the photographed picture planes is set as narrow as possible in order to reduce a loss of the photographic film, when a cutting position is decided in a range of the longitudinal length of the perforations, there might occur a fear of cutting the edge of the picture plane of the film.

In a perforated photographic film such as a conventional 35 mm photographic film or the like, frame numbers are normally preexposed on a side end of a photographic picture plane. However, in the case of a stereo photography, a photographic picture plane of one side of the other set is allocated between one set of right and left photographic picture planes, and hence it is extremely difficult to edit, combine, or match after the photographic film is cut, the frames based on the frame numbers.

Therefore, the photographic film is so formed that a central position of the front and rear sides of the perforations can be accurately cut to facilitate a film cutting operation and in order to facilitate an editing or matching operation of the stereo photographs after cutting, a technical problem to be solved is raised, and this invention has an object to solve the above-described problem.

SUMMARY OF THE INVENTION

Accordingly, it is an object of this invention to provide a photographic film which solves the above-described problem and in which perforations are disposed at a gap between photographic picture planes along the vicinities of both upper and lower side edges of a roll film characterized in that a cutting mark is described or placed as a latent image by preexposure at a central edge before and after each perforation, in that a frame number for a stereo photograph is described or placed as a latent image by preexposure at side edge of each photographic picture plane, in that a cutting mark is described or placed as a latent image by preexposure at a longitudinal central edge of each perforation and in that a frame number for a stereo photograph is described or placed as a latent image by preexposure at a side edge of each photographic picture plane.

A photographic film in a first embodiment has perforations which are disposed at a gap between photographic picture planes of the photographic film, and a cutting mark is placed as a latent image by preexposure at a central edge before and after the perforation. Accordingly, when the photographic film is cut with the cutting mark present at the central edge before and after each perforation opposed at upper and lower sides as a target, the film can be accurately cut at the center of the gap.

A photographic film in a second embodiment has frame numbers for a stereo photograph such as 1R, 2R, 3R, 1L, 2L, 3L, etc., are described or placed as latent images by preexposure at side edges of respective photographic picture planes. Accordingly, when photographing with a stereo camera having a film feeding mechanism corresponding to a pitch of the perforations of the photographic film and so constituted that as to start photographing always from a constant position on the film when the film is set in the camera, the frame numbers for the stereo photograph such as 1R, 2R, 3R, 1L, 2L, 3L, . . . are present at respective segments of the cut photographic film, and hence the frames can be easily edited, cut, manipulated, or combined based on the frame numbers for the stereo photograph.

Further, in a photographic film in a third embodiment, a cutting mark is described or placed as a latent image by preexposure at a longitudinal central edge of the perforations, and frame numbers are described or placed as latent images by preexposure at a side edge of the respective photographic picture planes. Accordingly, the photographic film has operations and advantages of both the photographic film as in the first and second embodiments, and cutting marks are disposed at a boundary position before and after individual photographic picture planes corresponding to the frame numbers for the stereo photograph, and hence the cutting marks have a function as a border line for judging areas individual photographic picture planes displayed by the frame numbers for the stereo photograph.

DESCRIPTION OF PREFERRED EMBODIMENTS

Figure 1:
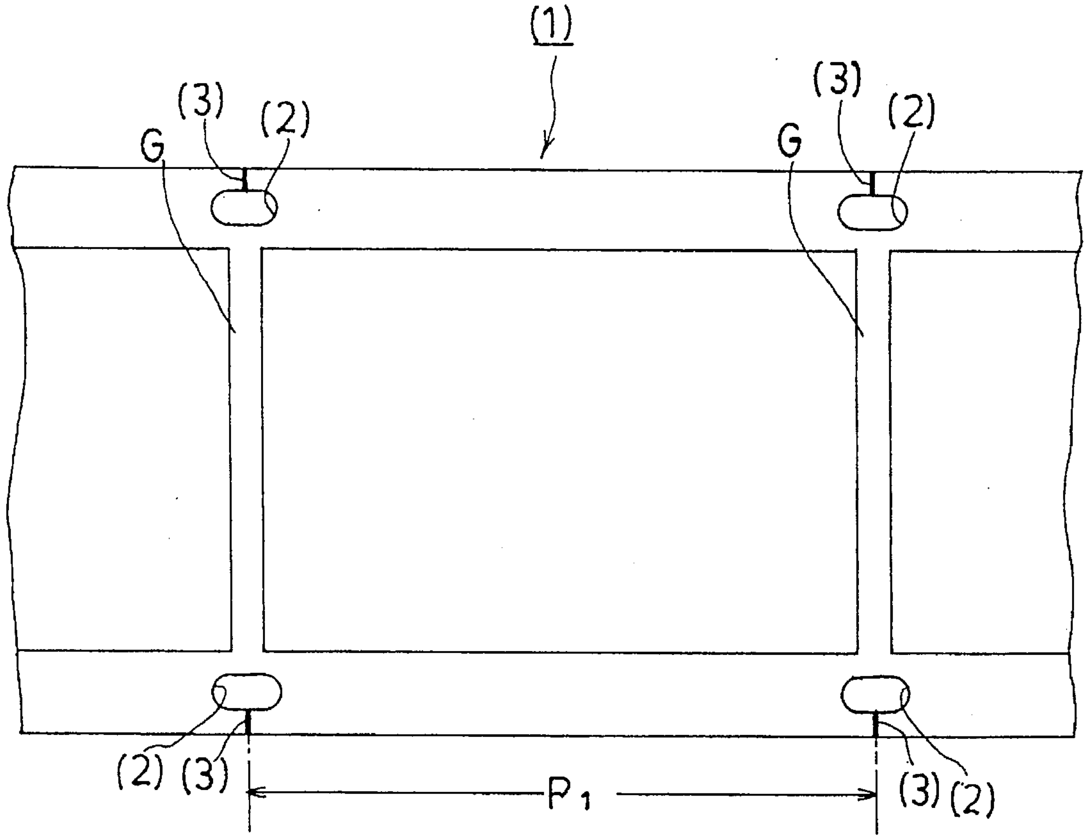
FIG. 1 is a front view showing a first embodiment of this invention.

An embodiment of the present invention will be described with reference to accompanying drawings. FIG. 1 shows a photographic film 1 as claimed in claim 1, and perforations 2 are provided in the vicinities of both upper and lower edges of the photographic film 1. A camera which uses the photographic film 1 is so designed as to set exposure position in order, as shown in FIG. 1, photographic picture planes at an intermediate portion between upper and lower and right and left perforations 2 and to equalize a pitch of the picture planes to a pitch $P_1$ of the perforations 2. The camera designed as described above is used, and hence upper and lower perforations 2, 2 become marks of cutting lines.

Cutting marks 3 are described or placed as latent images by preexposure at a central position of the peripheral edge of the respective perforations 2 in a longitudinal direction at both upper and lower edges of the photographic film 1. Therefore, cutting marks 3 are formed, after the film is developed, along a longitudinal line centrally placed between the gap G, referred to as a longitudinal central edge of the respective perforations 2. Therefore, by latent it is meant that the mark 3 is present, but invisible or inactive until being developed. Accordingly, when the photographic film 1 is photographed and then developed, the cutting marks 3 are present at both upper and lower edges of the gap G between the photographic picture planes at a longitudinal center line. In other words, the latent image cutting mark 3 is centrally positioned over the elongated perforation 2 at the longitudinal edge of the film 1. This located is referred to as the longitudinal central edge. Thus, when the photographic film is cut upper and lower cutting marks 3 act as targets of a cutting line. Therefore, the photographic film can be accurately cut at a center of the gap G.

Figure 2:
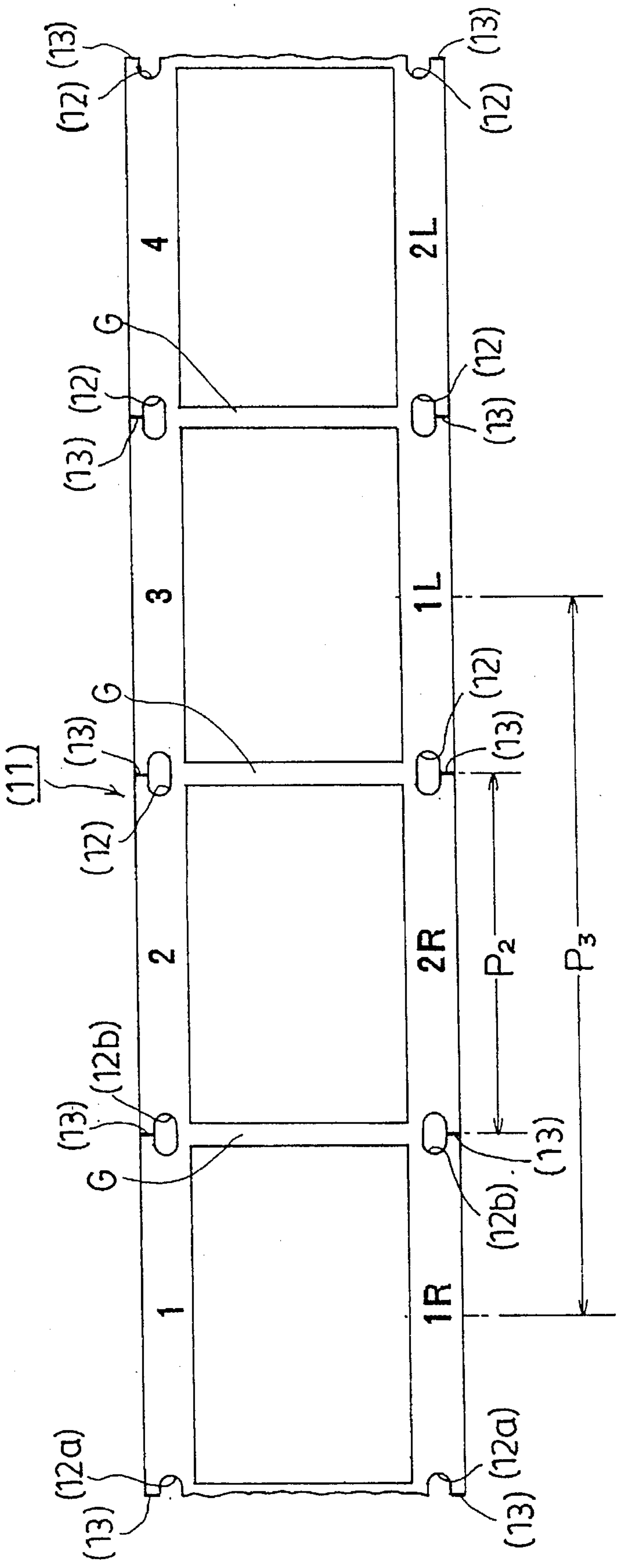
FIG. 2 is a front view showing another embodiment of this invention.

FIG. 2 shows a photographic film 11. Perforations 12 are provided at an interval of a pitch $P_2$ along the vicinities of both upper and lower edges of the photographic film 11, and cutting marks 13 are preexposed longitudinally at both upper and lower edge sides of the photographic film 11 at a longitudinal central position of the peripheral edges of the respective perforations 12. Conventional type frame numbers are preexposed at a central position of the adjacent perforations 12 at an upper edge of the photographic film 11, and frame numbers for a stereo photograph are preexposed at a lower edge the conventional type frame numbers.

The conventional type frame numbers are formed as a numeric character "1" at an intermediate position between predetermined perforations 12*a* and 12*b* near a winding side end of the photographic film 11, and sequentially formed in an increasing order as "2", "3", "4", "5", "6", . . . backward. On the other hand, frame numbers for the stereo photograph are formed as "1R" at a position opposed to "1" of the conventional type frame number, and sequentially formed as "2R", "1L", "2L", "3R", "4R", "3L", "4L", "5R", "6R", "5L", "6", "7R, . . . backward. Numeric characters of the frame numbers for the stereo photograph display the number of the order of the photographic picture planes, the "R" identifies the right picture plane of the photographic picture plane, and the "L" identifies the left picture plane of the photographic picture plane.

The photographic film 11 is placed in a stereo camera having a predetermined relationship with the photographic film 11, thereby performing predetermined operation and advantages. More particularly, the stereo camera photographs at a space of one picture plane between a right exposure plane and a left exposure plane and has a relationship of $P_3$:$P_2$=2:1 of a pitch $P_3$ of right and left exposure planes to a pitch $P_2$ of the perforations 12 of the photographic film 11. The stereo camera is so constituted that, when a predetermined film is set in the stereo camera, as disclosed in Japanese Patent Application 6-155,073 filed by the inventor of this application, an initial winding amount is controlled and a front end edge of a first photographic picture plane is always disposed at a predetermined winding position. The perforations 12*a* are disposed at positions corresponding to the predetermined initial winding positions of the photographic film 11.

When the photographic film 11 is placed in the stereo camera having the above-described relationship and photographed, a right picture is photographed at a position of the conventional type frame number "1", and a left picture is simultaneously photographed at a position "3" in a first photographing. In a second photographing, a right picture is photographed at a position "2", and a left picture is simultaneously photographed at a position "4". Right pictures and left pictures are sequentially simultaneously photographed at positions "4" and "7", "6" and "8", "9" and "11", . . . . When a combination of the pairs of the right and left pictures are replaced with frame numbers for the stereo photograph, the frame numbers sequentially become from a first picture "1R" and "1L", "2R and 2L", "3R and 3L", "4R and 4L", "5R and 5L". The perforations 12 are always disposed at the gap G between the photographic picture planes. Further, the cutting marks 13 are disposed at four corners of the photographic picture planes.

Therefore, the cutting marks 13 become border lines which indicate areas of individual photographic picture planes displayed by the frame numbers for the stereo photograph. That is, an area partitioned at four corners by four cutting marks 13, of two cutting marks 13 disposed immediately near front and rear sides of the frame number for a certain one stereo photograph and two cutting marks 13 disposed at an upper edge of the photographic film 11 opposed to the two cutting marks 13 becomes an area of a photographic picture plane displayed by a frame number for the one stereo photograph. Accordingly, the area of the photographic picture plane displayed by the frame number "1R" can be, for example, clearly recognized by using the four cutting lines 13 disposed at longitudinal central edge of the four perforations 12*a*, 12*a*, 12*b*, 12*b* of the perforations 12*a* and 12*b* immediately near front and rear sides of the frame number "1R" for the stereo photograph and the perforations 12*a* and 12*b* of an upper edge of the photographic film 11 opposed to the perforations 12*a* and 12*b* as for marks (border lines) of the area.

When the photographic film 11 is developed after the photographing is finished, the conventional type frame numbers, the frame numbers for the stereo photograph and the cutting marks 13 which are preexposed can be visually recognized. Thus, when the photographic film 11 is cut with the cutting marks 13 opposed at upper and lower sides as targets, the photographic film 11 can be accurately divided into individual segments along a longitudinal central line of the gap G. When the segments of the cut photographic film 11 are divided into sets, each having two picture planes, are formed as numbers "1R and 1L", "2R and 2L", "3R and 3L" based on the frame numbers for the stereo photograph displayed at the lower edge, a combination of a pair of right and left pictures, which are difficult to identify only by the conventional frame numbers, can be easily edited, matched or combined to form the stereo photograph.

Figure 3:
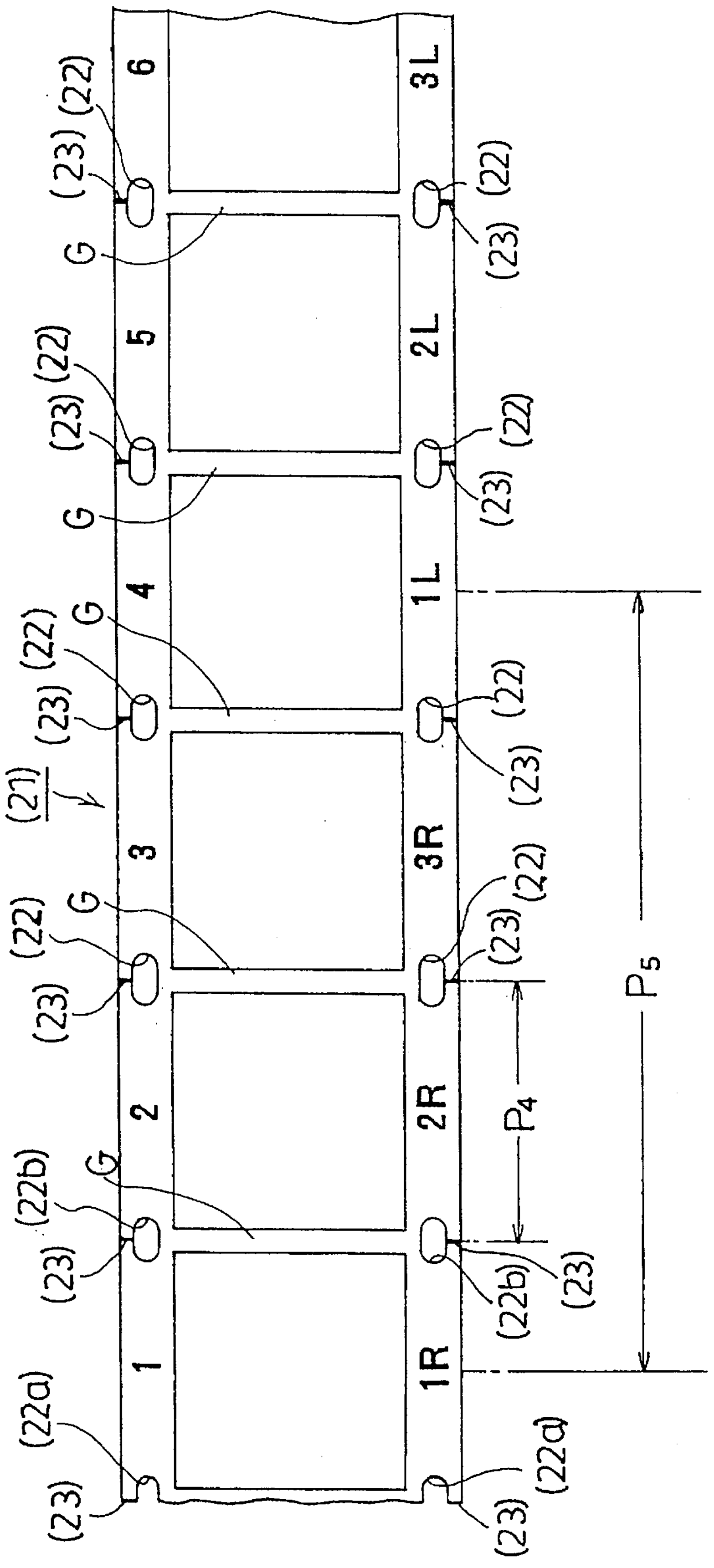
FIG. 3 is a front view showing still another embodiment.

FIG. 3 shows a photographic film 21 as according to still another embodiment of this invention. A photographic film 21 has perforations 22 provided at an interval of a pitch $P_4$ along the vicinities of both upper and lower side edges of the photographic film 21 similarly to the photographic film 11 and conventional type frame numbers, frame numbers for a stereo photograph, and cutting numbers 23 formed by preexposure. A difference of the embodiment shown in FIG. 3 from the embodiment in FIG. 2 is that a stereo camera having the relationship with the photographic film 21 photographs with a space corresponding to two picture planes between a right exposure plane and a left exposure plane, there is the relationship of $P_5$:$P_4$=3:1 of a pitch $P_5$ between the right and left exposure planes of the stereo camera to a pitch $P_4$ between the perforations 22 and further that disposing order of the frame numbers for the stereo photograph are different. That is, the frame numbers for the stereo photograph of the photographic film 21 are formed as "1R" at an intermediate position between a perforation 22*a* disposed at an initial winding position and a perforation 22*b* immediately after the perforation 22*a*, and sequentially formed at each three sets of right and left frame numbers as "2R", "3R", "4R", "5R", "6R", "4L", "5L", "6L", "7L", "8L" toward a backward direction.

As described above, when the photographic film 21 is loaded in the stereo camera having the relationship with the photographic film 21, the stereo camera sequentially photographs from first photographing right pictures and left pictures in the order of "1" and 4", 2 and 5", 3 and 6", "7 and 10", "8 and 11", "9 and 12, . . . simultaneously at right and left pictures. When the combination of the pairs of the right and left pictures is replaced with frame numbers for the stereo photograph, it sequentially becomes from the first photographing "1R and 1L", "2R and 2L", "3R and 3L", "4R and 4F", "5R and 5F", . . . . The perforations 22 are always disposed at a gap G between the photographic picture planes.

As described above, when the photographic film 21 is developed, the photographic film 21 can be accurately cut along a center line of the gap G with the cutting marks 23 as targets similarly to the case of the photograph 11. When segments of the cut photographic film 21 are arranged based on the frame numbers for the stereo photograph present at its lower edge, a combination of the pairs of upper and lower pictures can be easily edited combined or matched.

This invention can be applied to a 35 mm photographic camera generally sold in the market at present by using a camera having predetermined relationship to the photographic film. The present invention may be variously modified within the scope and spirit of the present invention, and the modifications thereof will be naturally included in the scope of the present invention.

As described in detail with respect to the above-mentioned embodiments, when the cutting marks are described or placed as the latent images by preexposure at longitudinal central edges of the perforations and the cutting marks present after developing are used as targets to cut the photographic film, the center of the gap between the photographic picture planes of the film can be accurately cut.

When the frame numbers for the stereo photograph are described as the latent images by preexposure at side edges of the photographic picture planes and the developed and cut stereo photographic film are arranged based on the frame numbers for the stereo photograph, the stereo photographic film can be extremely easily edited or cut and combined.

Further, when the cutting marks and the frame numbers for the stereo photograph are combined, the cutting marks can be also used to function as border lines for judging an area of the individual photographic picture planes displayed by the frame numbers for the stereo photograph.

I claim:

1. A photographic film having a longitudinal length comprising:

a plurality of perforations near both longitudinal edges of the film; and a plurality of preexposed cutting marks extending from said plurality of perforations to at least one of the longitudinal edges of the film, whereby said plurality of preexposed cutting marks form a latent image so that when the film is developed visible cutting marks are formed in a gap between photographic picture planes.

2. A photographic film as in claim 1 wherein:

said plurality of preexposed cutting marks are formed on a longitudinal center line of the gap.

3. A photographic film as in claim 1 further comprising:

a plurality of preexposed frame numbers placed near one of the longitudinal edges.

4. A photographic film as in claim 1 further comprising:

a plurality of preexposed stereo photography frame numbers placed near one of the longitudinal edges, wherein the plurality of preexposed stereo photography frame numbers are used to match the photographic picture planes in forming a stereo photograph.

5. A photographic film having a plurality of perforations disposed at a gap between photographic picture planes near both upper and lower side edges of a roll film, comprising a plurality of cutting marks described as latent images by preexposure at a longitudinal central edge of said perforations.

6. A photographic film having a plurality of perforations disposed at a gap between photographic picture planes near both upper and lower side edges of a roll film, comprising a plurality of cutting marks described as latent images by preexposure at a longitudinal central edge of said respective perforations and a plurality of frame numbers for a stereo photograph described as latent images by preexposure at a side edges of said photographic picture planes.

* * * * *